(12) United States Patent
Utsumi (10) Patent No.: US 6,671,871 B2
(45) Date of Patent: Dec. 30, 2003

(54) TECHNICAL INFORMATION MANAGEMENT SYSTEM

(75) Inventor: Yasuhiro Utsumi, Chiba (JP)

(73) Assignee: Fujitsu Limited, Kawasaki (JP)

( * ) Notice: Subject to any disclaimer, the term of this patent is extended or adjusted under 35 U.S.C. 154(b) by 51 days.

(21) Appl. No.: 08/990,458

(22) Filed: Dec. 15, 1997

(65) Prior Publication Data

US 2002/0026629 A1 Feb. 28, 2002

(30) Foreign Application Priority Data

Jun. 25, 1997 (JP) .............................................. 9-169225

(51) Int. Cl.[7] .............................. G06F 9/44; G06F 7/00; G06F 17/30
(52) U.S. Cl. ..................... 717/101; 717/120; 707/104.1; 707/1
(58) Field of Search ........................... 395/712, 500.48, 395/701; 345/333; 707/1–10, 100–104.1, 200–206; 710/8; 717/168–178, 100–123

(56) References Cited

U.S. PATENT DOCUMENTS

| | | | | | |
|---|---|---|---|---|---|
| 4,558,413 A | * | 12/1985 | Schmidt et al. | ............. | 707/203 |
| 4,875,162 A | * | 10/1989 | Ferriter et al. | ................ | 705/29 |
| 4,887,206 A | * | 12/1989 | Natarajan | ..................... | 705/29 |
| 5,123,103 A | * | 6/1992 | Ohtaki et al. | .................. | 707/5 |
| 5,191,534 A | * | 3/1993 | Orr et al. | ..................... | 700/105 |
| 5,297,279 A | * | 3/1994 | Bannon et al. | ......... | 707/103 R |
| 5,317,729 A | * | 5/1994 | Mukherjee et al. | ............. | 707/3 |
| 5,448,727 A | * | 9/1995 | Annevelink | .................. | 707/101 |
| 5,530,861 A | * | 6/1996 | Diamant et al. | ............... | 705/8 |
| 5,564,119 A | * | 10/1996 | Krawchuk et al. | ............. | 707/4 |
| 5,724,589 A | * | 3/1998 | Wold | ............................. | 709/318 |
| 5,761,079 A | * | 6/1998 | Drumm | ........................ | 716/11 |
| 5,761,674 A | * | 6/1998 | Ito | ........................... | 707/104.1 |
| 5,771,179 A | * | 6/1998 | White et al. | ........................ | 1/1 |
| 5,787,414 A | * | 7/1998 | Miike et al. | .................... | 707/2 |
| 5,794,013 A | * | 8/1998 | McBrearty | .................... | 703/27 |
| 5,809,329 A | * | 9/1998 | Lichtman et al. | .............. | 710/8 |
| 5,812,995 A | * | 9/1998 | Sasaki et al. | ................... | 707/1 |
| 5,844,554 A | * | 12/1998 | Geller et al. | ................ | 345/744 |
| 5,845,119 A | * | 12/1998 | Kozuka et al. | ............. | 717/107 |
| 5,862,346 A | * | 1/1999 | Kley et al. | ................... | 709/245 |
| 5,864,480 A | * | 1/1999 | Ladd | ............................ | 700/83 |
| 5,878,262 A | * | 3/1999 | Shoumura et al. | .......... | 717/164 |
| 6,035,297 A | * | 3/2000 | Van Huben et al. | ............. | 707/8 |

FOREIGN PATENT DOCUMENTS

| | | |
|---|---|---|
| AU | 62470/94 | 9/1994 |
| AU | 30259/95 | 3/1996 |
| AU | 31717/95 | 3/1996 |
| AU | 59462/96 | 1/1997 |

OTHER PUBLICATIONS

Australian Office Action dated May 1, 1998 of Australian Patent Appln No. 48367/97.

* cited by examiner

Primary Examiner—Hoang-Vu Antony Nguyen-Ba
(74) Attorney, Agent, or Firm—Staas & Halsey LLP (57) ABSTRACT

A method of developing a computer system includes entering information relevant to the system under development, retrieving engineering information that pertains to it's development, then browsing through the engineering information thus retrieved. The information relevant to the system under development relates to its configuration, development processes, or the roles of the developers in its development, etc. The information also can include data that helps identify a plurality of products that make up the system under development. The method is performed using an engineering information management system including an engineering information storage unit, in which engineering information about the computer system under development is stored in association with information about it's development. The system includes a program for entering information relevant to the system under development, a program for retrieving engineering information that pertains to its development, as entered by the entry program, from the engineering information storage unit, and a program for outputting the engineering information that is retrieved. A check program allows the entry of information as to whether the engineering information retrieved has been checked and allows storing the results of such checks. A verification program allows the verifying of the check information that indicates percentage of engineering information already checked and that is yet to be checked.

12 Claims, 12 Drawing Sheets

PROJECT ID: TEST 01

CATEGORY:
- COMMON INFORMATION
- C/S LINKAGE
- RDA BASICS
- DATABASE BASICS
- 4GL BASICS
- PRODUCT B, F, Z

USERS:
- ☒ SYSTEM DESIGNER
- ☐ APPL. DESIGNER
- ☐ DB LOGIC DESIGNER
- ☐ DB ADMINISTRATOR
- ☐ ALL

PROCESS: ☒ SA  ☐ UI  ☐ SS  ☐ PS  ☐ PG

[LIST CHECK ITEMS]   [BACK]

FIG. 9

NUMBER OF ITEMS 185

| PROCESS | RANK | CHECKED ITEM | CHECKED | HANDLED |
|---------|------|--------------|---------|---------|
| PS | 1 | CONNECTIVITY PERFORMANCE | ☐ | ☐ |
| PS | 1 | DROP TABLE, TRUNCATE TABLE | ▩ | ☐ |
| PS | 1 | COMMON SPECIFICATIONS | ☐ | ☐ |
| PS | 1 | DOES DESIGN ALLOW SPEED | ▩ | ▩ |
| PS | 1 | FORMS VERIFICATION | ☐ | ☐ |

| CATEGORY | COUNT | CHECKS | ESSENTIAL CHECKS | PROGRESS RATE |
|---|---|---|---|---|
| COMMON INFO | 50 | 10 | 3 | 80% |
| DB BASICS | 100 | 30 | 10 | 70% |
| C/S LINKAGE | 50 | 20 | 5 | 60% |
| 4GL BASICS | 30 | 15 | 2 | 50% |
| B PRODUCT | 20 | 20 | 15 | 0% |
| F PRODUCT | 100 | 95 | 30 | 5% |

TECHNICAL INFORMATION MANAGEMENT SYSTEM

BACKGROUND OF THE INVENTION

1. Field of the Invention

The present invention is directed to a technical information management system for a development support system that facilitates the work of developing computer systems, and, more particularly, to a system for entering information relevant to the computer system under development, retrieving the engineering information that pertains to its development, and then browsing through the engineering information thus retrieved.

2. Description of the Related Art

Many of the problems arising after the development of a computer system such as, but not limited to, degraded performance or failure to get started or connected are traceable to errors in the design process. These errors include database or application design errors and C/S linkage errors. These errors may well have been caused by lack of a full consideration that should have been directed at the extensive scope of engineering information normally associated with the development of a computer system.

Generally, the development of a computer system involves the development of application programs that run in conjunction with a mix of middleware (existing software) products. The only way to avoid the errors mentioned above and other errors is for the developers to read through the entire documentation related to the products that make up the computer system under development so they can understand the concepts expressed therein.

In addition, the documentation supplied with a product covers an extensive array of information, from general topics to very specific topics of use only in exceptional situations. Much of the information is irrelevant to the particular computer system under development. Moreover, single computers are built on such a large repertoire of software products that gaining full insight into the associated vast store of engineering information prior to preceding with design work would be almost hopeless.

Typically, a system is brought into being by introducing or using a mix of middleware products and developing application programs to run on these middle products. However, the use of middleware products produced by a single vendor to develop a computer system has become rare in recent years.

In increasingly fewer cases, developers resort to the same set of middleware products to develop a computer system. More often than not, they choose middleware products adapted from one development project to another. Consequently, each time they embark on a new development project, they have to read documentation that contains a large amount of engineering information.

What is needed is a system that has the means available to store engineering information related to a computer system under development so that only the required pertinent information is retrieved.

SUMMARY OF THE INVENTION

It is an object of the present invention to provide a system capable of storing engineering information related to a computer system under development so that only the required pertinent information is retrieved.

It is another object of the present invention to enable users to develop high-quality computer systems without having to read through an entire set of documentation covering vast amounts of engineering information each time they embark on a development project.

It is a further object of the present invention to have engineering information stored in association with a computer system under development retrieved by entering questions regarding items pertinent to the development of the computer system.

It is an additional object of the present invention to facilitate access to information relevant to a particular system under development from a vast store of engineering information, thereby allowing the developers to focus on the information that is truly needed, thereby reducing development errors.

It is also an object of the present inventions to allow developers to proceed with their work by obtaining only the information and technologies that are relevant to their current tasks in the chain of successive development processes.

It is a still further object of the present invention to enable management to check the status of checklist items, so that developers can make better decisions as to when to move to the next process with the check status taken into consideration.

It is another object of the present invention to improve the quality of a system under development.

The above objects can be attained by a system that includes an engineering information storage unit, in which engineering information about the computer system under development is stored in association with information about the development process for the computer system. A program for entering information relevant to the system under development is provided along with a program for retrieving engineering information that pertains to the development of the computer system from the engineering information storage unit. A program for outputting the engineering information that is retrieved is also provided.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
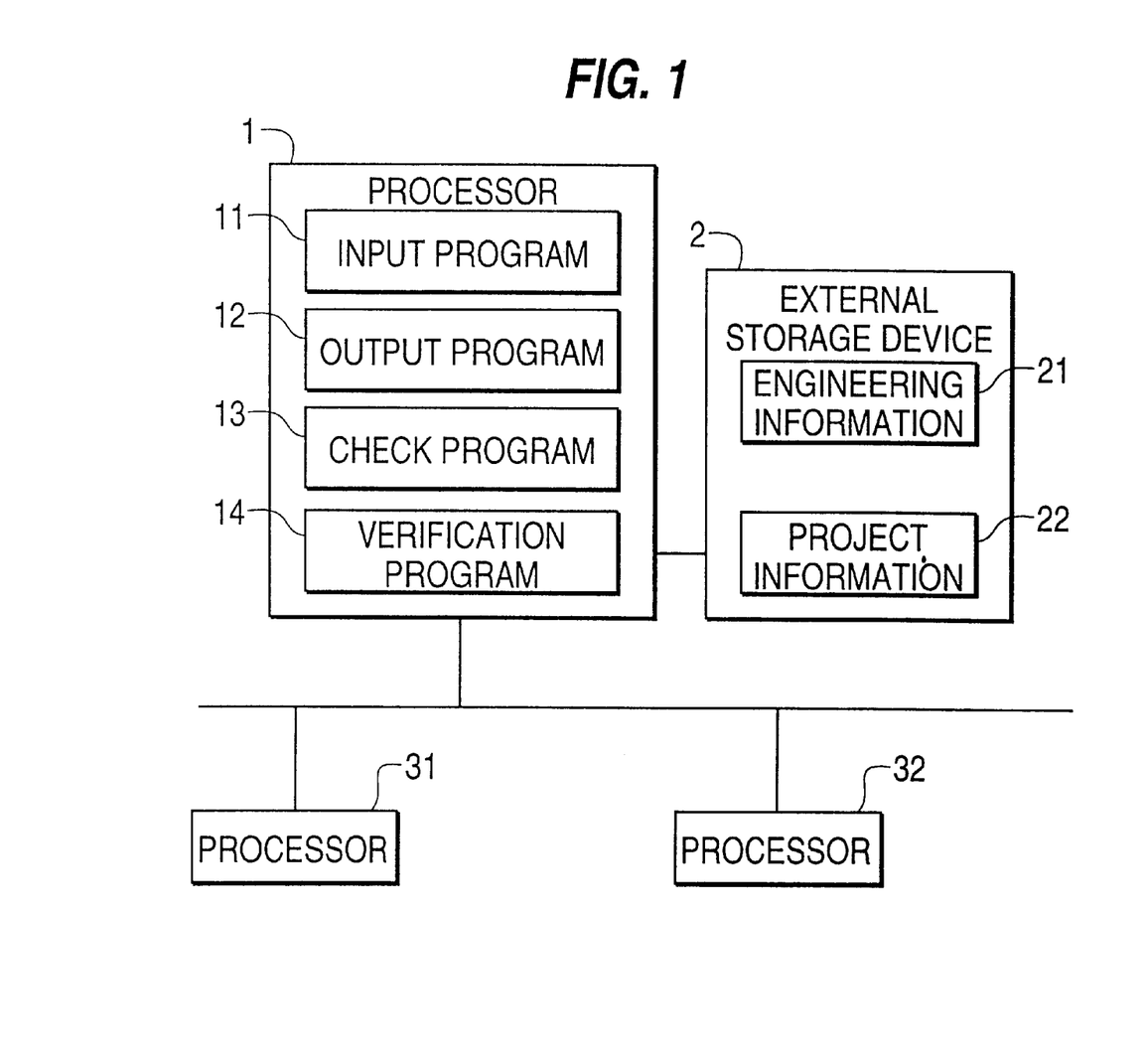
FIG. 1 depicts a system configuration of an embodiment of the invention.

The present invention is directed to an engineering information management system which, as explained below, is used by the developers of a computer system during system development. The system configuration, as depicted in FIG. 1, includes a first processor 2 coupled to an external storage device 2. Other or second processors 31 and 32 request processing by the first processor 1 and obtain the output results of such processing. An input program (which program could also be called subprogram or subroutine) 11 is used for entering/adding information about a project or tasks related to developing a computer system while an output program 12 is provided for retrieving engineering information according to the developers' roles in the fulfillment of the project. A check program 13 is provided for handling checks of the status of the engineering information retrieved, and a verification program 14 is provided for verifying the check status entered via the program 13 on an output device. An engineering information storage unit 21, such as a disk drive, is provided for storing the engineering information while a project management storage unit 22, which can also be a disk drive, stores project process information and check list type information for the project's engineering information.

Figure 2:
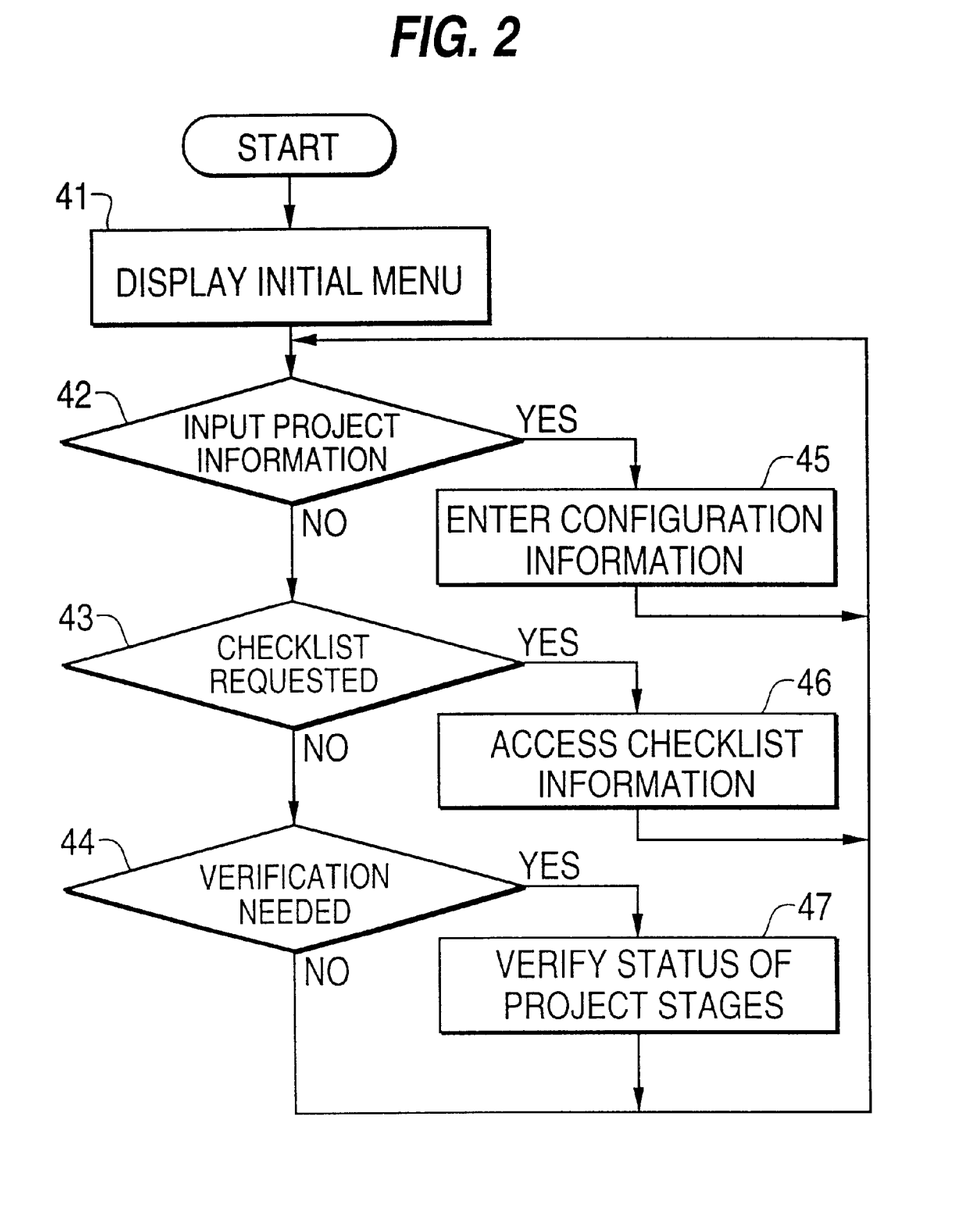
FIG. 2 shows the general flow of processing in an embodiment of the invention.

The general processing flow of an embodiment of the present invention, as depicted in FIG. 2, will be described with reference to FIG. 1 and the general processing behavior of the engineering information management system of the present invention will described. The engineering information management system, when started by an operator, displays 41 an initial graphical user interface that preferably includes a button type menu with buttons "clickable" with a mouse. This initial menu contains a button for initiating the process of entering information about the system development project, a button for initiating the process of handling engineering information checklists, and a button for initiating the process of verifying the check status. In steps 42, 43, and 44 in FIG. 2, the system tests for a button click that indicates that a specific action, as directed by the mouse, is to take place.

The project information entry button is used in the initial stage of the work flow of system development. When this button is selected, as determined by step 42, the program 11 used for project information entry is started 45 and displays a window for entering project information. The operator is prompted to enter the relevant information into this window, such as the configuration of the system under development and information about the software products to use. When entry is complete, the program 11 writes the entered information to the project management storage unit 22. The project information entry process is described later in greater depth with reference to FIG. 3.

The checklist handling button is selected as appropriate through the course of the work flow of system development and can be selected at any time between the start and finish of the work. When this button is selected, as determined by step 43, the program 13 is started 46 and displays a window into which the operator enters conditions for making checks on the progress of the project. In this window, the operator enters the project ID, the processes scheduled, and the operator's role in the work flow of system development, etc. The operator then conventionally searches through the data in the project management storage unit 22 by using the input project ID as a key to retrieve the system configuration and software product information, etc. stored in the project management storage unit 22. Engineering information is retrieved from the engineering information storage unit 21 to search through this data for a relevant checklist using the operator's role in the work flow of system development, etc. as search keys. The operator is then prompted to check against this checklist and store the status of the processes, etc. in a check status management table. The checking process is described later in more detail with reference to FIG. 4.

The check status verification button, like the checklist handling button, is selected as appropriate through the course of the work flow of the system development. When this button is selected, as determined by step 44, the program 14 is started 47 to search through the check status management table, either created or updated by the program 13, to generate the status of the engineering information project progress, etc.

Figure 3:
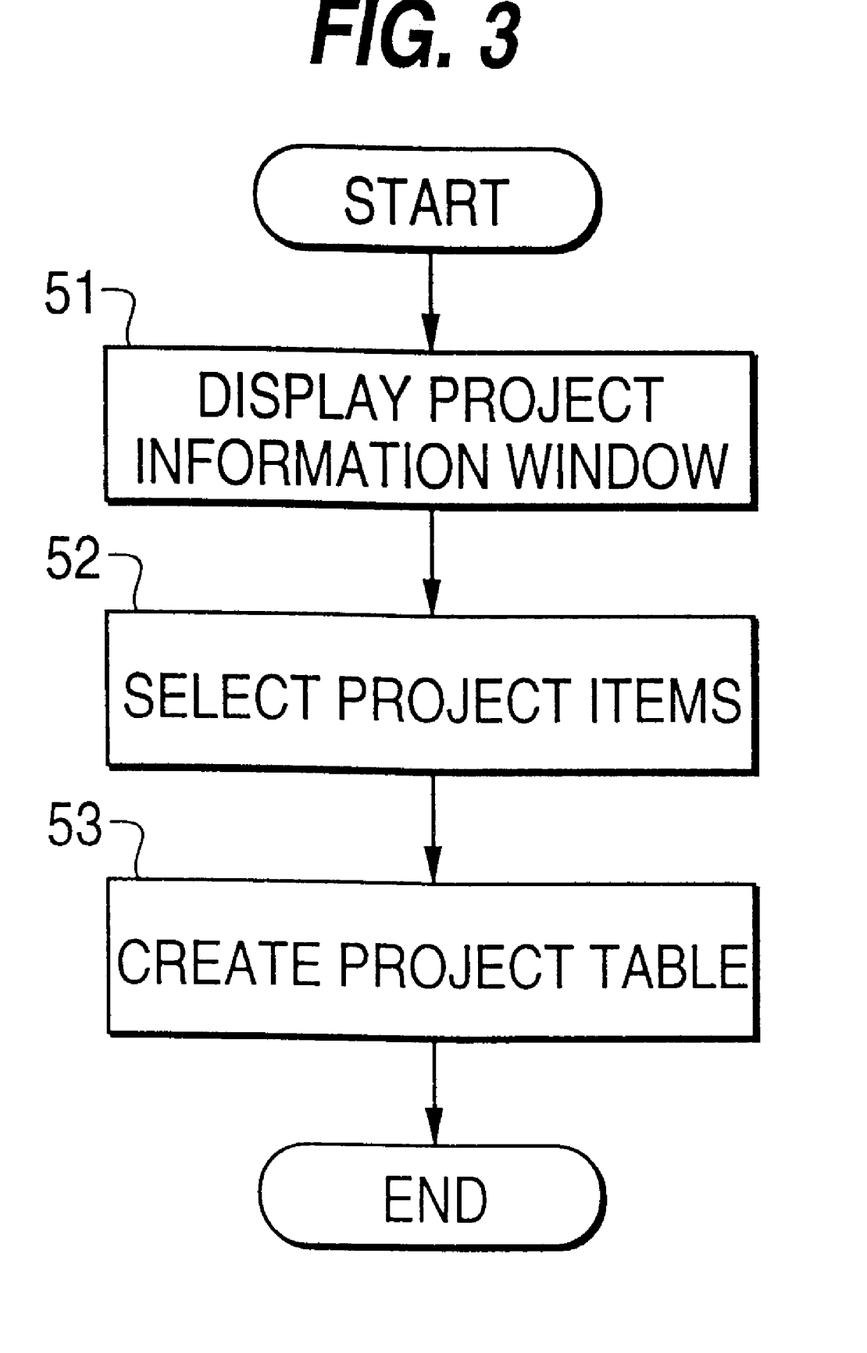
FIG. 3 shows the general flow of entering project information.
Figure 7:
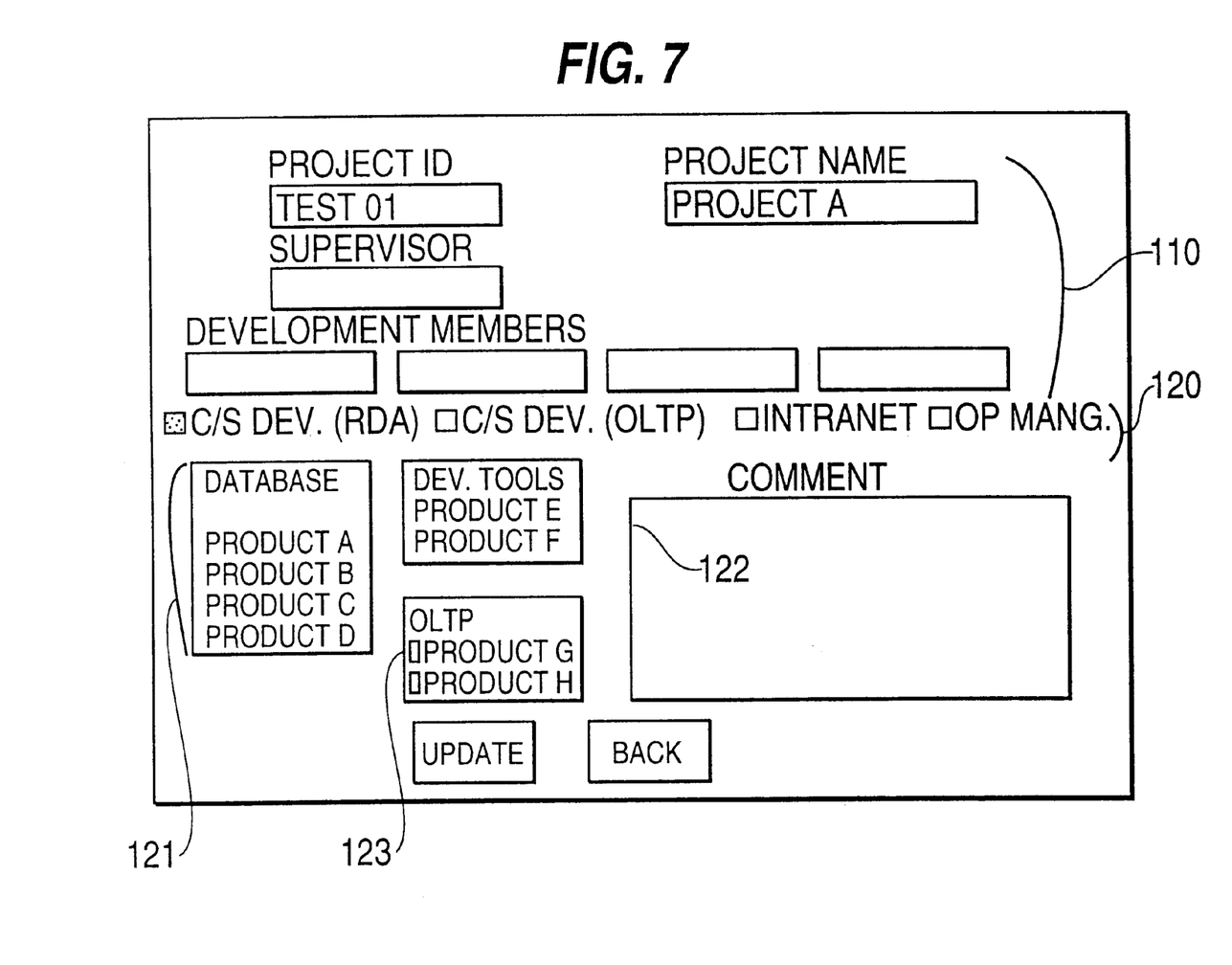
FIG. 7 depicts a project information entry window.

The project information entry process is depicted in FIG. 3, which illustrates the flow of the project information entry process 45. The program 11 for project information entry starts by displaying 51 a project information entry window, such as depicted in FIG. 7. In the window of FIG. 7 the operator fills in the fields 110 with the project ID, project name, project supervisor's name, and development members' names, as prompted. The operator also specifies the configuration of the system under development in field 120. In this sample display, "C/S Development (RDA)" has been selected, as indicated by the dark selection box, from among the choices of "C/S Development (RDA)," "C/S Development (OLTP)," "Intranet," and "Operations Management." Selecting "C/S Development (RDA)" results in the operator making a choice for the database type in field 121 and a choice for the development tool type in field 122. But the OLTP type in field 123 is not accessible/selectable.

Figure 6:
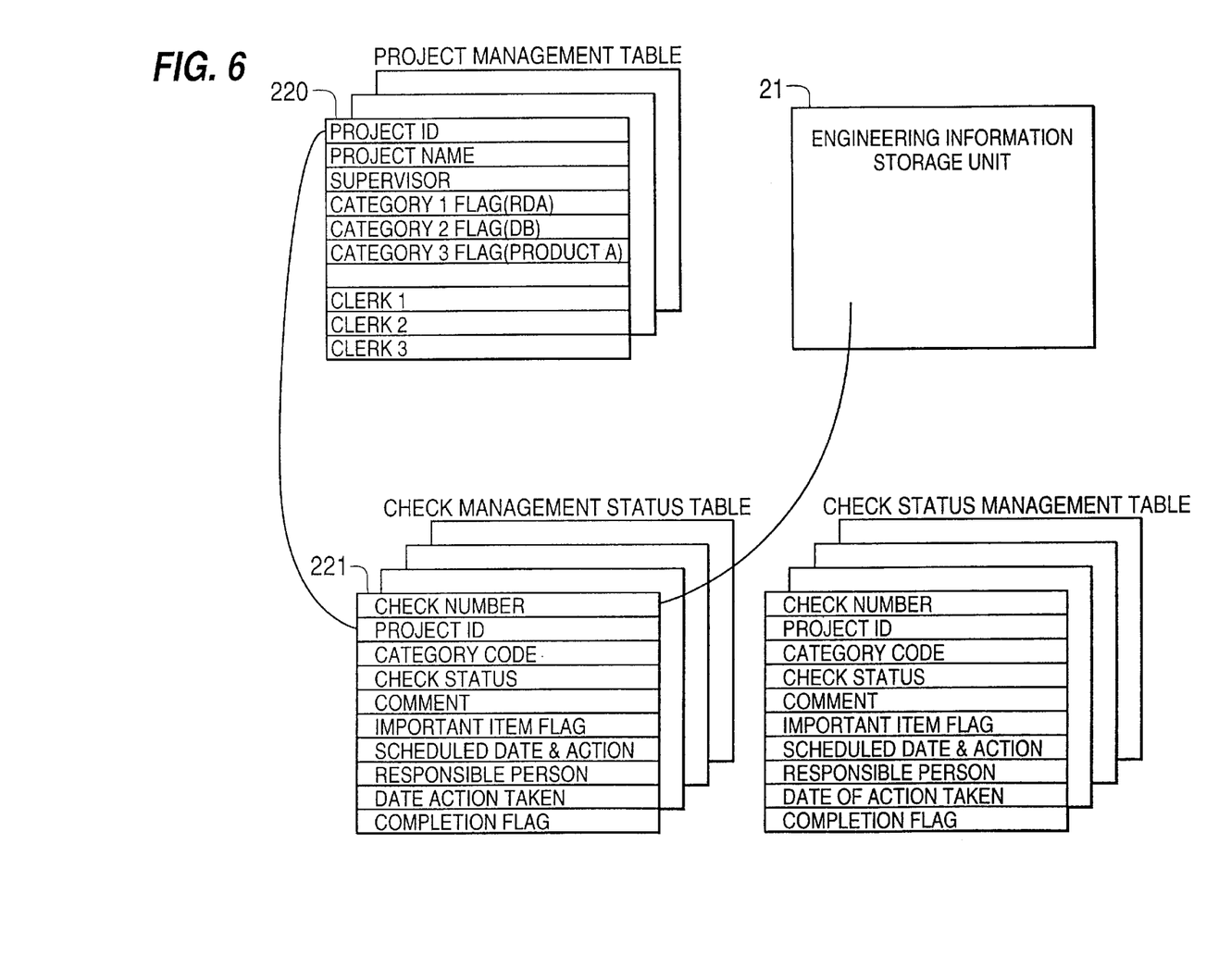
FIG. 6 illustrates data configuration of data in a project management storage unit.

If the operator selects the system configuration of "C/S Development (OLTP)," the OLTP type in field 123 becomes selectable. Thus, a specific choice determines the selectability/accessibility in step 52 of a subsequent item where project ID, system configuration, mix of products, etc. can be selected. When the entry of project information is complete, a project management table 220, as shown in FIG. 6, is created 53 according to the entries. One set of data is created for each project covered in the project management table 220.

The fields "Project ID," "Project Name," "Supervisor," "Clerk 1," and "Clerk 2" are filled with input information as it is supplied. The value of "Category Flag" is set according to the system configuration and software product information entered in the window shown in FIG. 9. In the example shown in FIG. 9, if the system configuration of "C/S Development (RDA)" has been selected, both flags—"Category 1 flag (RDA)" and "Category 2 flag (DB)"—are set on. Category flags are set according to the choice of corresponding product types in step 53. The particular checklist depicted in FIG. 9 includes an item for checking the database connectivity scheme for performance to determine whether the connectivity scheme has been selected based on the type of database and the connectivity. A second item is for checking to determine whether DDL statements such as DROP TABLE and TRUNCATE TABLE have been used in any job application. The third checklist item shown in this sample is a check of whether a large number of items of the system, such as printers, adhere to common specifications such as for print position and pitch. The fourth item of this sample checklist is a reminder to check for speed related issues such as whether the design allows for faster printing such as whether unnecessary ruled lines or mixed fonts are used for printing. The last checklist item indicates that a check should be made as to whether a scheme has been defined for verifying forms requirements, such as specifications must not be finalized on the basis of design documents created for a particular word processor.

Figure 5:
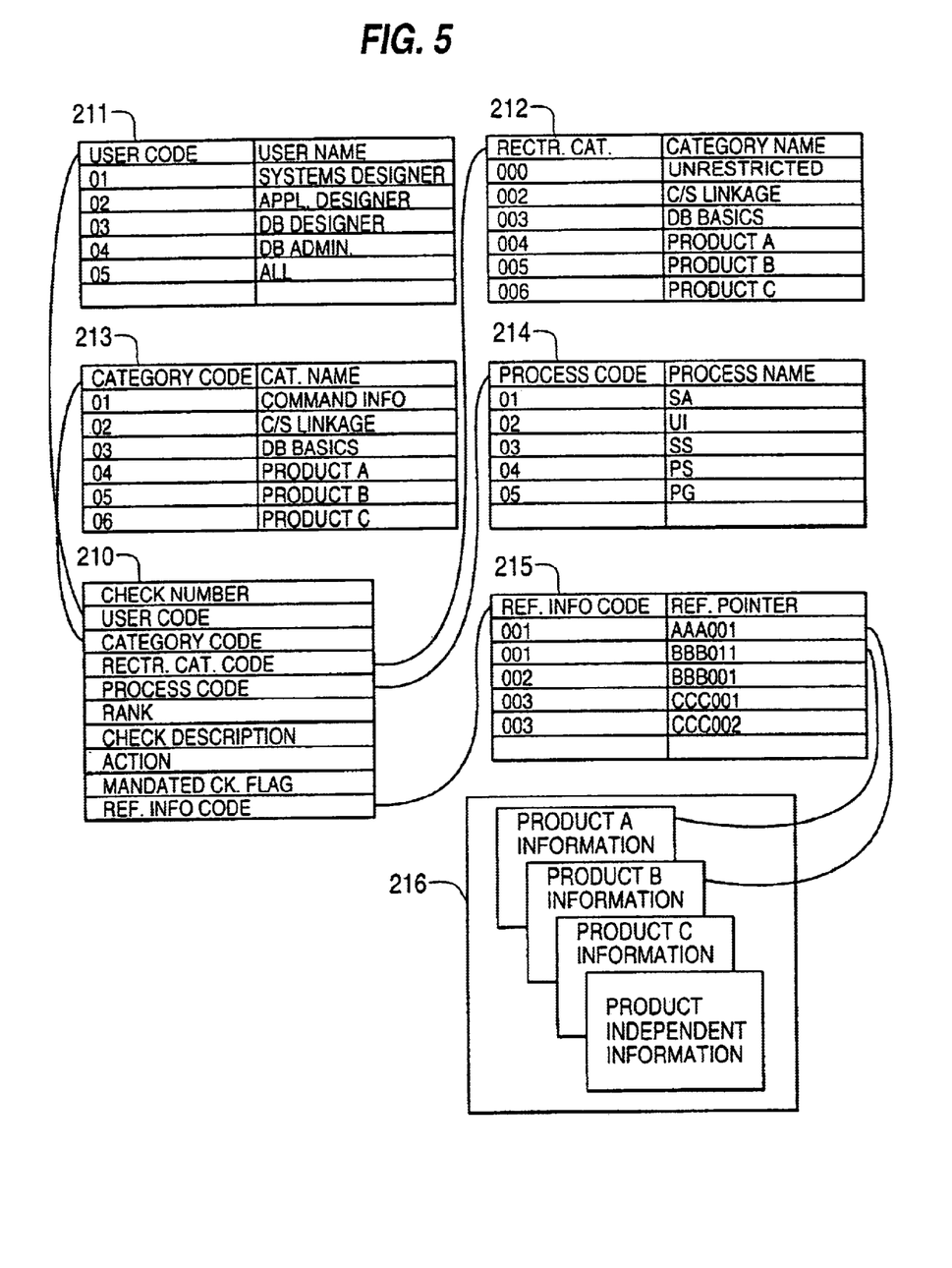
FIG. 5 illustrates data configuration of data in an engineering information storage unit.

FIG. 5 illustrates the data structure of the data stored in the engineering information storage unit 21. Engineering information is stored in the form of checklists, which point to the detailed information storage unit 216 for more detailed information. The checklist table 210 forms the core of the engineering information. The data structure of the checklist table 210 is described below.

Each individual checklist in the checklist table 210 is assigned a check number. Each checklist in the checklist table 210 is assigned a user code, category code, restricted category code, and process code in association with the engineering information covered in the checklist. These codes are used as primary keys to retrieve information of interest from the checklists.

Figure 10:
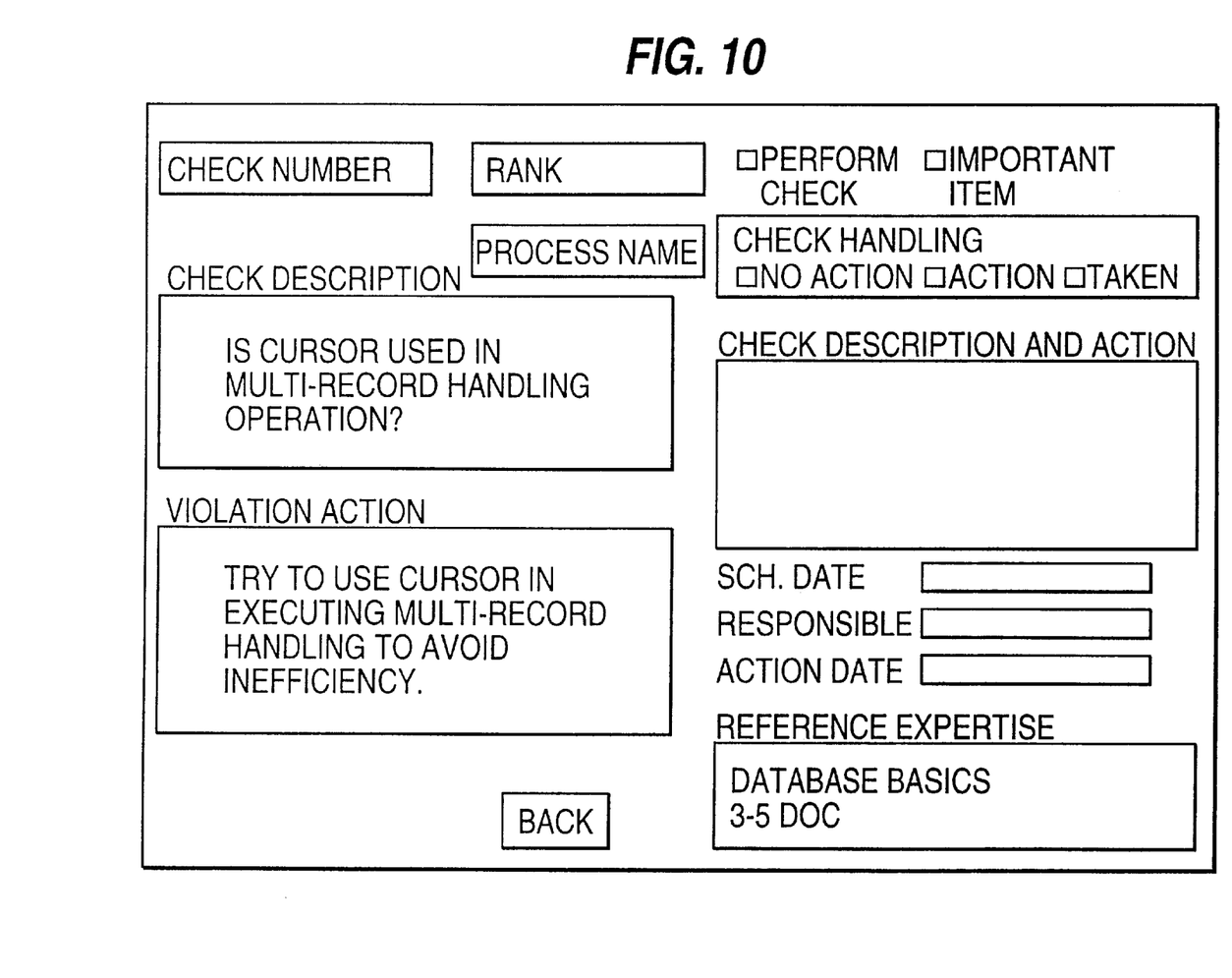
FIG. 10 depicts a checklist display window.

The field "Rank" in a checklist designates the importance of the engineering information. Engineering information is stored by itself in the field "Check Description." The engineering information stored in this field is entered in a string of one or two characters, as shown in FIG. 10, to facilitate ready checking (against a space having a capacity of 255 characters). The field "Action" contains information on the action taken in the event of a violation of the check, as shown in FIG. 10. The field "Mandatory Check Flag" contains a flag indicating whether a particular check is mandatory. The field "Reference Information Code" contains key information to provide a code for retrieving engineering information of interest in further depth.

Tables 211, 212, 213, and 214 (see FIGS. 5 and 6) each provide a correspondence between user codes, category codes, restricted category codes, and process codes as defined above and the corresponding names. The user code table 211, for example, categorizes engineering information users into systems designers, applications designers, database logic designers, and database administrators, and all users. In contrast, the category code table 212, breaks down the engineering information into common information, C/S linkage, database basics, product A, and so on. Product A, for example, designates engineering information that is specific to product A. The restricted category code table 213 contains information that helps restrict the aforementioned categories of engineering information in greater detail. In this embodiment, all category codes are used in the same sense. If information about product A is only used when product B is used, for example, "Product A" is assigned as Product A's category code and "Product B" is assigned as its restricted category code. If there is no need to restrict engineering information (e.g., engineering information that is essential to using product A) Product A is assigned the code 000 to mean "unrestricted." The process code table 214 contains a list of processes that require the checking of engineering information, including SA (system analysis), UI (user interface), SS (system structure), PS (program structure), and PG (programming). In this list, SA is the highest-order process, with PG being the lowest-order process. The reference information code table 215 contains a correspondence between engineering information in the checklists and the associated detailed engineering information. A reference information code of 001, for example, points to the files named AAA001 and AAA002 for the associated engineering information in greater detail.

Figure 8:
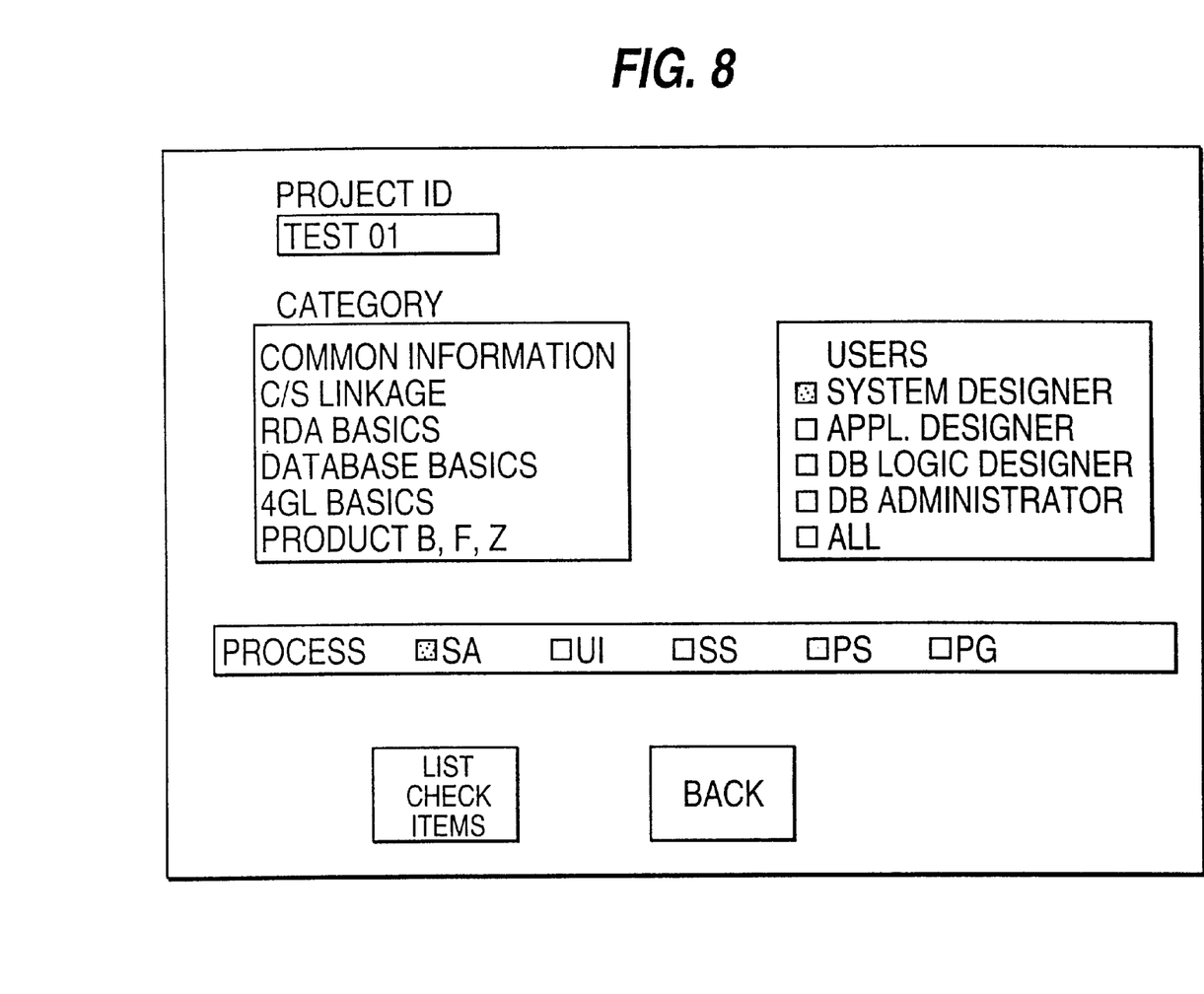
FIG. 8 depicts a check handling menu window.

Next, the entry checking process 46 will be described with reference to FIG. 4. When a check is requested, the check processing menu shown in FIG. 8 is displayed 61. The menu is displayed with the fields "Project ID" and "Category" being blank with no choice made in the fields "Users" and "Process." Then, whether the operator has entered a project ID is determined 62. If a project ID has been entered, the project management table 220 shown in FIG. 6 is searched for that project ID. If the ID is found, the name of the category having its category flag on is displayed 63 in the field "Category," as shown in FIG. 8.

When the operator enters choices in each of the fields "Category," "Users," and "Process" (multiple choices are permitted in each field), and then selects the "List Check Items" button, a determination is made 64 as to whether a listing has been requested, the checklist table 210 is searched 65 using the operator-specified category, user, and process as keys to retrieve the checklists in question.

If any retrieved checklist has a non-000 value (unrestricted) entered in its "Restricted field code" field, the project management table 220 is tested to see if the category flag corresponding to the restricted category code is on, so that only those checklists having the corresponding category flag on in the relevant project management table 220 are listed. For example, the information (checklist) about product A that is used only when product B is used is assigned "Product A" as its category code and "Product B" as its restricted category code. This checklist is retrieved only if both category flags corresponding to product A and product B in the project management table are on.

Figure 9:
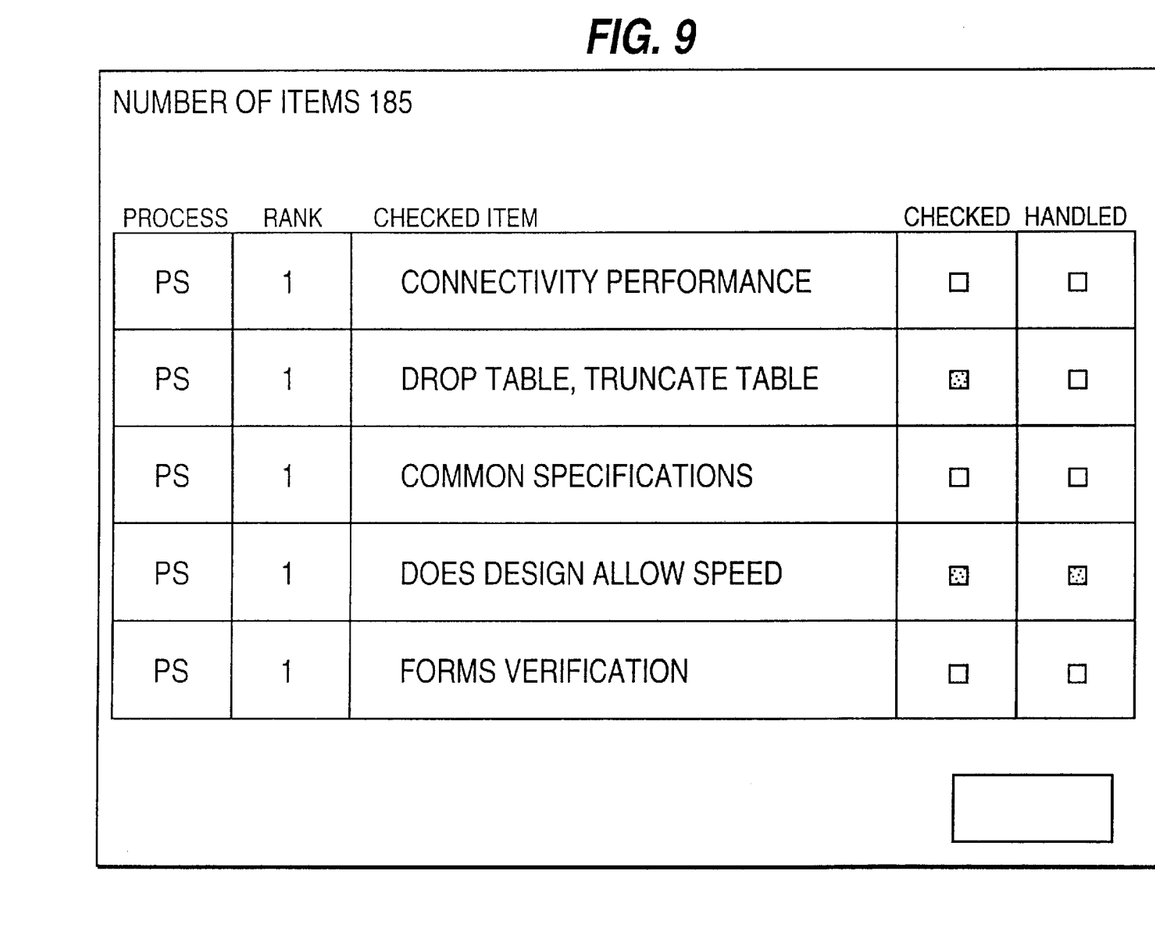
FIG. 9 depicts a checklist list display window.

Further, the check status management table 221 is searched 65 using the check number in the checklists retrieved and the project ID as keys to list the matching checklists, as shown in FIG. 9, with the addition of the status of checking the corresponding check status management table. In FIG. 9, an unchecked item (the box being unfilled) in the "checked" status field designates a checklist yet to be processed, and a checked item (the box being filled) designates a checklist already processed. A checklist that does not have a corresponding check status appearing with the fields "Checked" and "Handled" is displayed as unfilled meaning unselected. In the listing, the fields "Process," "Rank," and "Check items" are displayed to reflect the contents of the checklist table 210. The fields "Checked" and "Handled" are displayed to reflect the contents of the check status management table 221.

Figure 4:
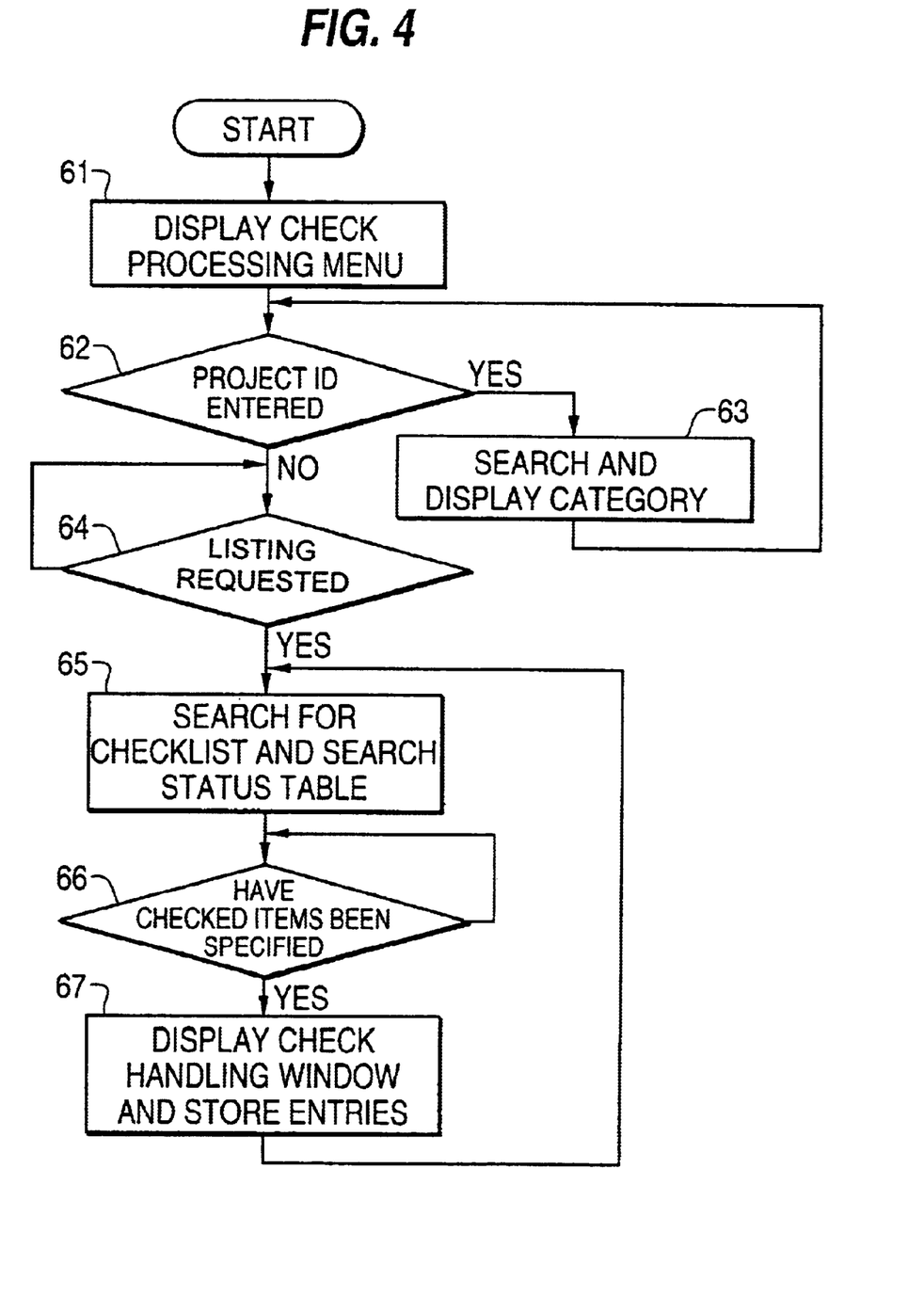
FIG. 4 shows the general flow of handling checks.

Of the checklists listed, those that have been selected by the mouse cursor are tested 66 (see FIG. 4). That checklist is displayed as shown in FIG. 10, with the entries stored 67 in the project management table as depicted 220.

In FIG. 10, the fields "Rank," "Process name," "Check description," "Action taken in the event of a violation of the check," and "Reference expertise" are displayed to reflect the contents of the checklist table 210. The fields "Perform Check" and "Check Handling" are displayed to reflect the data in the field "Check Status" in the check status management table 221. The fields "Important Item," "Check Description And Action," "Scheduled Date Of Action," "Person Responsible For Action," and "Action Date" are displayed to reflect the corresponding fields in the check status management table 221. The action of the operator's mouse performed on the field "Reference Expertise" in FIG. 10 is monitored so that a corresponding expertise file will be displayed as specified. The operator proceeds with entry of the items by observing/using the display, as shown in FIG. 10. To check the entries, the operator selects the field "Make A Check." Having selected the field, the operator is now ready to proceed to the field "Check Handling" ("No Action Required," "Action Required," "Action Already Taken"). The operator can check or clear a choice from the field "Check Handling" by observing/using the fields "Check Description" and "Action Taken In The Event Of A Violation Of The Check" (plus the field "Reference Expertise," as appropriate). When this entry is complete, a check status management table 221 is created to manage the status check. This table contains the check number, the initially entered project ID, the category code associated with the check number, the character strings (comments) entered in the field "Check Description And Action," Person "Responsible," "Scheduled Date" Of Action, and "Action Date" as entered in FIG. 10. If the operator has selected "No Action Required" or "Action Already taken" in the field "Check Handling," the completion flag is set on.

Figure 11A:
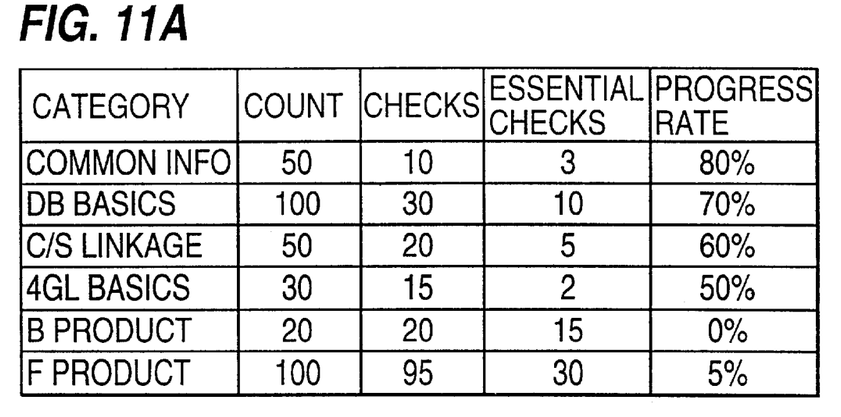
FIGS. 11A and 11B are check status verification sample printouts.
Figure 11B:
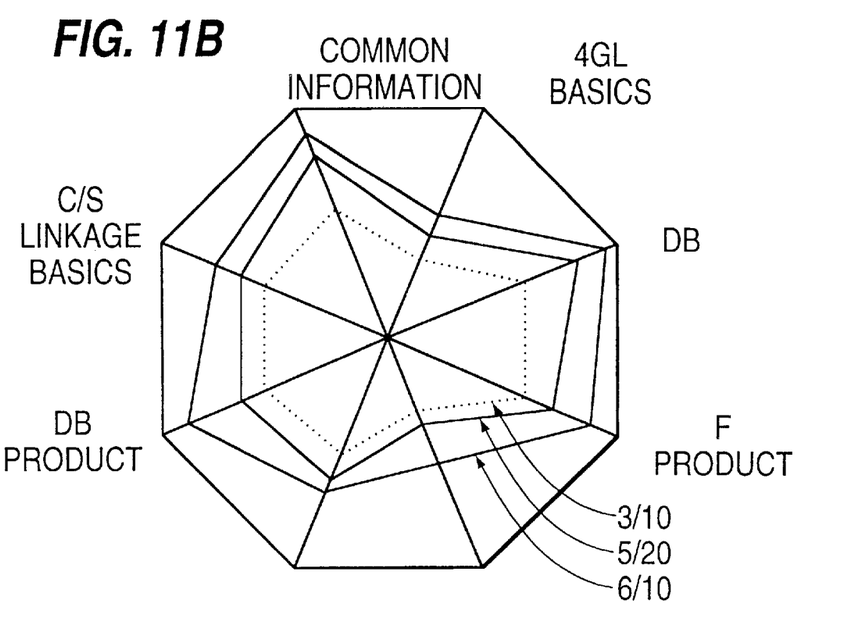

FIGS. 11A and 11B show sample printouts of the check status of step 47 in FIG. 2. The values of the column "Count" in FIG. 11A have been determined by searching through the checklist table 210 using as a key the category code having its category flag on to indicate "retrieved" based on the project ID. The values of the field "Checks" yet to be made have been calculated or determined by browsing through the fields "Category Code" and "Check Status" in the check status management table 221. The values of the column "Essential Checks" yet to be made have been calculated by browsing through the fields "Category Code," "Check Status," and "Important Item Flag." The values of the column "Progress Rate" have been calculated on the basis of the values of the columns "Count" and "Checks" yet to be made. FIG. 11B is a schematic representation of the statistics obtained in FIG. 11A.

Figure 12:
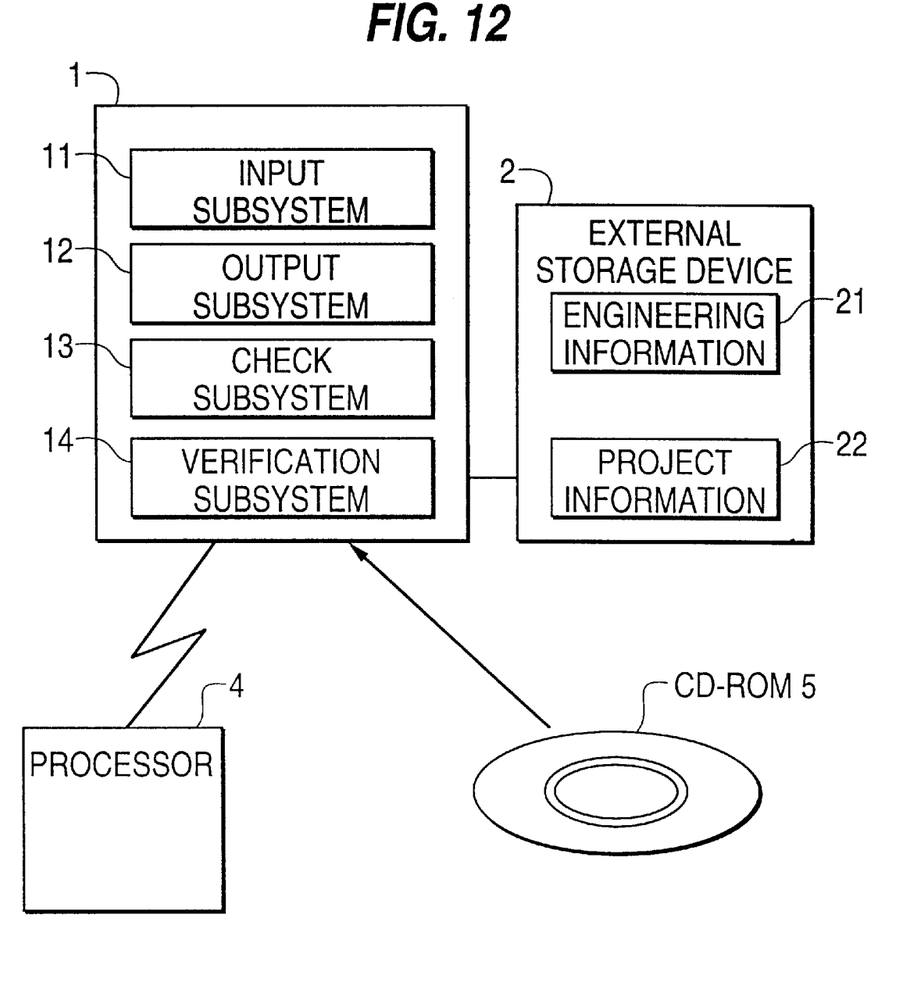
FIG. 12 depicts an approach to installing the system of the invention.

FIG. 12 is a diagram illustrating approaches to installing the system in an embodiment of this invention. In the diagram, the program 11 for entering project information, the program 12 for retrieving engineering information, the program 13 for handling checks, and the program 14 for verifying the check status are distributed to users on a computer-readable storage medium, such as a CD-ROM 5, then loaded into computer memory of processor 1 for execution. Similarly, the data structure of the data stored on the engineering information storage unit 21 is distributed on a computer-readable storage medium, such as the CD-ROM 5, then loaded by the program 12 into the processor 1. The diagram shows that engineering information stored on a CD-ROM is copied to an external storage device (such as a hard disk) for better loading performance.

In addition to loading data directly into the processor 1 from a storage media, such as the CD-ROM 5 mentioned above, data can be loaded from a remote processor 4 (an information provider processor) via a telecommunications line (not shown).

The implementation of this invention facilitates access to information relevant to a particular system under development from a vast store of engineering information, thereby allowing the developers to focus on the information that is truly needed, with the resultant benefits of reduced chances of committing errors in the design process and a reduced need for corrective action in development work.

Further, the developers can proceed with their work by obtaining only the information and technologies that are relevant to their current tasks in the chain of successive processes.

In addition, the invention enables management of the check status, so that developers can make better decisions as to when to move to the next process with the check status taken into consideration. The result is an improvement in the quality of the system under development.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of managing information associated with an application program development of a computer system, comprising:

inputting information corresponding to a development task of an application program development project of a computer system, the input information including at least one of a computer system configuration, a stage of development of an application program of a computer system, or a role of developers in application program development;

registering information related to products corresponding to the development project; and retrieving engineering information to be checked in conjunction with performance of the development task, the retrieved engineering information being selected from stored engineering information based on the input information and the registered information related to products for the development project.

2. An engineering information management system, comprising:

an engineering information storage storing engineering information to be checked during an application program development of a computer system, the engineering information being associated with development tasks according to project information for an application program of a computer system;

an input program inputting information corresponding to a development task for development of the application program;

a registering program registering information related to products corresponding to the development task;

a retrieval program retrieving engineering information to be checked in conjunction with performance of the development task, the retrieved engineering information being selected from the stored engineering information based on the input information and the information related to products; and an output program outputting the retrieved engineering information.

3. An engineering information management system as recited in claim 2, wherein the input information comprises computer system configuration.

4. An engineering information management system as recited in claim 3, wherein the input information comprises information identifying a plurality of products to be included in the application program under development.

5. An engineering information management system as recited in claim 2, wherein the input information comprises stages of application program development of the computer system.

6. An engineering information management system as recited in claim 2, wherein the input information comprises roles of a developer in application program development of the computer system.

7. An engineering information management system as recited in claim 2, further comprising:

a check program inputting information as to whether engineering information retrieved by the retrieval program has been checked, and storing the check result.

8. An engineering information management system as recited in claim 7, wherein said input information by said input program, which is used with said retrieval program as a retrieval key, includes the information identifying each project, and said check program manages check results in units of projects.

9. An engineering information management system as recited in claim 7, further comprising:

a check verifying program outputting a ratio of checked engineering information to unchecked engineering information based upon the information stored by said check program.

10. A computer-readable storage medium storing a program for directing a computer, said medium including:

an engineering information storage storing engineering information to be checked during an application program development of a computer system, the engineering information being associated with development tasks according to project information of an application program of a computer system;

an input program inputting information corresponding to a development task for development of the application program;

a registration program registering information related to products corresponding to the development task;

a retrieval program retrieving engineering information to be checked in conjunction with performance of the development task, the retrieved engineering information being selected from the stored engineering information based upon the input information and the project information; and an output program outputting the retrieved engineering information.

11. A computer-readable storage medium, on which engineering information about computer systems is stored in a data structure permitting retrieval of selected engineering information therefrom based on project information for an application program and input information corresponding to a development task for an application program development of the computer system, the retrieved engineering information to be checked in conjunction with performance of the development task.

12. A system for managing engineering information, comprising:

a data storage storing engineering information and linking the engineering information to project information for an engineering project through tables and categories within the tables; and a management system managing the input, output and status of information for the engineering project, registering the project information, and retrieving engineering information from said data storage responsive to input information corresponding to a task of the engineering project, the retrieved engineering information being selected based on the input information and the project information.

* * * * *